United States Patent
Kolodziej et al.

(10) Patent No.: US 6,221,130 B1
(45) Date of Patent: Apr. 24, 2001

(54) METHOD OF COMPRESSING AND DRYING A GAS AND APPARATUS FOR USE THEREIN

(75) Inventors: Robert M. Kolodziej, Varysburg; Edward S. Czechowski, Orchard Park, both of NY (US)

(73) Assignee: Cooper Turbocompressor, Inc., Houston, TX (US)

( * ) Notice: Subject to any disclaimer, the term of this patent is extended or adjusted under 35 U.S.C. 154(b) by 0 days.

(21) Appl. No.: 09/370,304

(22) Filed: Aug. 9, 1999

(51) Int. Cl.[7] .......................... B01D 53/04; B01D 53/26
(52) U.S. Cl. ...................... 95/41; 95/120; 95/126; 96/111; 96/122; 96/128; 96/130; 96/143
(58) Field of Search .................. 95/39, 41, 117, 95/120, 126; 96/111, 122, 126–128, 130, 133, 143, 146

(56) References Cited

U.S. PATENT DOCUMENTS

| | | | |
|---|---|---|---|
| 1,831,644 | * 11/1931 | Adair et al. | 95/41 X |
| 2,747,681 | * 5/1956 | Schuftan et al. | 96/122 |
| 3,011,589 | * 12/1961 | Meyer | 96/41 |
| 3,395,511 | * 8/1968 | Akerman | 95/41 |
| 3,398,506 | * 8/1968 | Baldus | 95/41 |
| 3,568,406 | * 3/1971 | Dynes | 96/128 X |
| 4,247,311 | * 1/1981 | Seibert et al. | 96/111 |
| 4,449,994 | * 5/1984 | Hegarty et al. | 95/41 X |
| 4,898,599 | 2/1990 | Settlemyer | 55/28 |
| 5,037,458 | 8/1991 | Trepaud | 55/162 |
| 5,137,548 | * 8/1992 | Grenier et al. | 95/41 |
| 5,209,764 | 5/1993 | Eberling | 55/162 |
| 5,378,266 | 1/1995 | Elamin | 96/114 |
| 5,632,802 | 5/1997 | Grgich et al. | 95/10 |
| 5,681,370 | 10/1997 | McMahon | 95/105 |
| 5,925,169 | * 7/1999 | Vertriest | 95/126 X |
| 5,968,234 | * 10/1999 | Midgett, II et al. | 95/120 |

FOREIGN PATENT DOCUMENTS

| | | |
|---|---|---|
| 0 274 781 A2 | 7/1988 | (EP) . |
| 0 799 635 A1 | 10/1997 | (EP) . |
| 60-175520 | * 9/1985 | (JP) ........... 96/126 |
| 62-298426 | * 12/1987 | (JP) ........... 96/126 |
| 0735286 | * 5/1980 | (SU) ........... 96/126 |

* cited by examiner

*Primary Examiner*—Robert H. Spitzer
(74) *Attorney, Agent, or Firm*—Kurt D. Van Tassel; Deborah G. VandenHoff; Van Tassel & Associates (57) ABSTRACT

A method and apparatus for compressing and drying a gas, typically air, are provided in which a multistage compressor is employed to produce interstage and final stage compressed gas. Regenerative adsorbent is employed to dry the final stage compressed gas. Interstage gas is used to regenerate the saturated adsorbent. Preferably, two beds of regenerable adsorbent are provided, each operable in a drying mode and a regeneration mode. In the drying mode, final stage compressed gas is passed through the bed of adsorbent in order to be dried, until the adsorbent is saturated. In the regeneration mode, moisture is removed from the saturated adsorbent by a stream of interstage compressed gas. The two beds are preferably alternately operated in the drying mode and the regeneration mode, in order to provide a continuous process.

23 Claims, 6 Drawing Sheets

METHOD OF COMPRESSING AND DRYING A GAS AND APPARATUS FOR USE THEREIN

TECHNICAL FIELD OF THE INVENTION

The present invention relates to a method and apparatus for compressing and drying a gas. In particular, the invention relates to a method and apparatus using a multistage compressor to compress the gas and a regenerative dryer for drying the gas.

BACKGROUND OF THE INVENTION

Typically, a compressed gas has a high moisture content upon leaving the compressor. This is particularly the case with compressed air. Moisture present in the compressed gas can give rise to problems in the equipment using the compressed gas and is generally undesirable. In certain applications, it is necessary to reduce the moisture content of the compressed gas, before it can be used.

A number of drying systems are known for use in the drying of compressed gas. Most commonly applied are refrigerated dryers, deliquescent dryers and desiccant dryers. Desiccant dryers are known in the art and have been applied in the preparation of dried compressed gas. The desiccant dryers may operate as so-called "single shot" dryers, in which the desiccant is used to dry the gas until it is saturated with moisture, after which it is removed and replaced with fresh desiccant. A preferred desiccant dryer is the so-called "regenerative" dryer, in which the desiccant may be regenerated in situ and reused, without the need for removal and replacement. The regenerative desiccant dryers may employ pressure or vacuum swing techniques to regenerate the desiccant. Alternatively, the desiccant may be regenerated using heat to remove the accumulated moisture from the desiccant.

Heat regenerative desiccant dryers typically operate as follows. Gas to be dried is passed through the bed of desiccant. Moisture in the gas is adsorbed by the desiccant. Once the desiccant is saturated with moisture, the unit is typically taken off-line and the desiccant heated. Heating the desiccant evaporates the moisture, which leaves the dryer as vapor. Once the desiccant is dried, the unit is again placed on-line to continue drying the gas. A variety of schemes for heating the saturated desiccant and regenerating it have been disclosed in the prior art. A number of the prior art systems rely upon heating elements to provide the necessary heat to regenerate the adsorbent. Such systems require an additional external source of power in order to generate the necessary heat. Alternative systems attempt to utilize the heat produced during the compression of the gas. Such systems use the compressed gas itself either directly or indirectly to heat the adsorbent in order to effect regeneration. A number of the systems employ dried compressed gas product in order to carry out the regeneration procedure. Still further prior art systems rely upon the heat generated during the compression of the gas, for example using oil withdrawn or recovered from the compressor as the heating medium.

In the method and apparatus disclosed in U.S. Pat. No. 4,898,599 a gas, typically air, is compressed using an oil flooded screw compressor. The compressed gas is dried by being passed through a bed of moisture adsorbing material or desiccant. In order to regenerate the saturated adsorbent, hot oil from the compressor is recovered from the compressed gas stream leaving the compressor and passed through heat exchange tubes extending through the adsorbent bed. Heat from the oil drives moisture from the adsorbent, thus regenerating it ready for the drying of further compressed gas.

U.S. Pat. No. 5,681,370 describes a regenerative desiccant dryer system, in which two desiccant beds are employed. Each bed is operated alternately in a so-called "dry" mode, in which dry air is drawn from the bed, and a so-called "purge" mode, in which the bed is purged of moisture and the desiccant regenerated. Purging of the bed is achieved by heating the desiccant in order to remove the moisture retained by the desiccant during the operation in the dry mode. The apparatus of U.S. Pat. No. 5,681,370 comprises two desiccant beds in a housing. A heating element is provided in order to provide heat required to remove moisture and regenerate the desiccant.

U.S. Pat. No. 5,632,802 discloses an apparatus and method of regenerating adsorbers for drying. The apparatus and method for removing moisture from compressed air requires that moisture is removed from the air before the air is compressed. The apparatus to dry the pre-compressed air comprises a desiccant bed, through which the moisture-containing air is caused to pass before being compressed. Once the desiccant is saturated with adsorbed moisture, it is regenerated using heat. Air is drawn in through a filter and heated using a heating element. This heated air is then passed through the desiccant bed being regenerated. The action of the heated air on the desiccant is to desorb moisture by removing it from the pores of the desiccant. The desiccant beds are preferably stated to be in a radial configuration about a core member.

U.S. Pat. No. 5,037,458 relates to an apparatus for regenerating an adsorber in a gas drying plant. In the apparatus disclosed, two beds of adsorbent are used to dry moisture-containing compressed air. While in operation, one of the adsorbers is in the drying phase and dries the compressed gas, while the other of the adsorbers is in the regeneration phase. The regeneration of the adsorbent is carried out by taking a portion of the dried compressed air, mixing it with an amount of moisture-containing air and heating the resulting mixture by heat exchange with the moisture-containing compressed air. The thus heated mixture is passed through the bed of adsorbent to be regenerated in order to remove adsorbed moisture from the bed.

A similar method of drying a compressed gas to that described in U.S. Pat. No. 5,037,458 is disclosed in European Patent Application publication No. 0 799 635 A1. In this document, compressed gas leaving a compressor is dried by being passed through a bed of adsorbent. Adsorbent saturated with moisture is regenerated by using a portion of the dried compressed gas, which is first heated by utilizing heat generated by the compressor.

Prior art systems for drying compressed gas relying upon heating elements to regenerate the adsorbent, either directly or indirectly by means of the heating of a purge gas, require an additional supply of power, typically electricity. Systems relying upon the use of the dried compressed gas as the regenerating agent reduce the efficiency of the overall compressing and drying process, by diverting a portion of the dried compressed gas product away from the desired end use. Further inefficiencies arise once it is decided to treat the purge gas leaving the bed of adsorbent being regenerated and remove the moisture. Finally, systems relying upon the hot compressed gas as the source of heat for the regeneration stage depend upon the gas leaving the compressor being at optimum conditions for the regeneration of the adsorber. In many circumstances, this is not the case.

Accordingly, there is a need for an improved system for the compression and drying of a gas, for example air, which allows for an optimal use of the heat generated by the compressor to regenerate the adsorbent, while leaving the regeneration independent of the condition of the final compressed gas leaving the compressor. In addition, it would be advantageous if such a system would not have to rely upon an external supply of energy in order to provide or supplement the heat required for regeneration of the adsorbent.

SUMMARY OF THE INVENTION

According to the present invention there is provided a method for compressing and drying a gas, comprising compressing the gas in a multistage compressor, which compressor produces both interstage and final stage compressed gas, and drying the final stage compressed gas by contacting the final stage compressed gas with a regenerable adsorbent, in which method interstage compressed gas is used to regenerate the adsorbent.

In a further aspect, the present invention provides apparatus for compressing and drying a gas, comprising a compressor have a plurality of compression stages and capable of producing interstage compressed gas and final stage compressed gas, a dryer comprising a bed of regenerable adsorbent, in which the final stage compressed gas may be contacted with the adsorbent in order to dry the gas, and in which interstage gas may be contacted with the adsorbent in order to regenerate the adsorbent.

The compressor is a multistage compressor having two or more compression stages. Gas being fed to the compressor is thus compressed to the desired pressure of the final stage compressed gas in a plurality of stages. The interstage compressed gas referred to hereinbefore is the compressed gas leaving one stage of the compressor and being passed to the following stage to undergo further compression. In contrast, final stage compressed gas is the gas leaving the final stage of compression at substantially the pressure required by the end use to which the compressed gas is to be put. Interstage gas must be capable of being removed from the compressor after at least one of the stages before the final compression stage and be fed to the dryer in order to regenerate the adsorbent. The compressor may have two compression stages, interstage compressed gas being taken from the outlet of the first compression stage in order to regenerate the adsorbent in the dryer. Alternatively, the compressor may comprise three or more compression stages, with interstage compressed gas being removable from the outlets of one or more of the compression stages before the final compression stage. The compressor may be arranged so that all of the interstage gas leaving a given compression stage may be removed and fed to the dryer for the purposes of regenerating the adsorbent. Alternatively, the compressor may be equipped, for example with valves, so as to allow only a portion of the complete flow of the interstage gas leaving a given stage to be directed to the dryer.

In a preferred embodiment, the compressor comprises three compression stages, the interstage compressed gas leaving the second compression stage being employed to regenerate the adsorbent. In an alternative preferred embodiment, three compression stages are employed, with interstage compressed gas leaving the first compression stage being used to regenerate the adsorbent.

The multistage compressor may comprise a plurality of single stage compressor units linked in series. Suitable single stage compressor units are well known in the art and available commercially. Alternatively, a compressor comprising a plurality of compression stages arranged integrally within a compressor unit may be employed, provided that the compressor unit is adapted to allow interstage compressed gas to be removed from and returned to the unit. As a further alternative, a combination of single compressor units and multistage compressor units may be employed.

Suitable compressors for use in the method and apparatus of the present invention are well known in the art and include centrifugal, screw and reciprocating compressors. It is preferred to use compressors which do not produce a compressed gas containing significant quantities of oil, as the presence of oil can have a deleterious effect on the adsorbent. Centrifugal compressors are particularly suitable for use in the present invention. In particular, centrifugal compressors produce a compressed gas product which is substantially free of oil and other contaminants.

The dryer comprises an adsorbent or desiccant. The adsorbent is arranged in a bed, supported within a vessel. The vessel is provided with an inlet and an outlet so arranged that a gas may be caused to flow into the vessel and through the bed of adsorbent, before leaving the vessel. The bed of adsorbent is operable in both a drying mode and a regeneration mode. In the drying mode, final stage compressed gas is passed through the bed. The adsorbent removes moisture from the gas. Once the adsorbent is saturated with moisture, indicated by the moisture content of the compressed gas leaving the bed rising above the desired level, the flow of final stage compressed gas to the bed is stopped and the bed operated in the regeneration mode. In the regeneration mode, interstage compressed gas is caused to flow through the bed of adsorbent, the effect of which is to desorb the moisture and remove it from the bed. Once the adsorbent has been sufficiently regenerated, indicated by the moisture content of the interstage compressed gas leaving the adsorbent bed falling below a predetermined level, the adsorbent bed may be once more operated in the drying mode.

In the regeneration mode, the interstage compressed gas may be caused to flow through the bed of adsorbent in the same direction as the flow of final stage compressed gas during operation in the drying mode. For optimum regeneration of the adsorbent, it may be preferable to have the interstage compressed gas flow through the bed in the reverse direction to the flow of final stage compressed gas.

In a preferred embodiment, the dryer comprises two beds of adsorbent. In this way, a virtually continuous drying of the final stage compressed gas may be accomplished, by having one bed operating in the drying mode, while the other bed is being regenerated. The beds may thus alternate between the drying mode and the regeneration mode, in order to provide for a continuous drying of the final stage compressed gas. The two beds may be arranged within a single vessel, the vessel comprising suitable means to separate the two beds of adsorbent and provide independent flows of gas to, through and from each of the beds. A preferred configuration is to have the two beds of adsorbent each located in a separate vessel. A most convenient mode of operation of this embodiment is to allow the adsorbent bed operating in the regeneration mode to continue operation in that mode until the adsorbent bed operating in the drying mode becomes saturated with moisture, indicated by the dew point of the dry product gas reaching a predetermined level. At this point, the operating mode of each bed may be switched.

The dryer may comprise three or more beds of adsorbent, again retained within one or more vessels as described above. The three or more beds may be operated so as to provide for a continuous drying of the final stage compressed gas in a similar manner to that described above. Thus, one or more adsorbent beds may operate in the drying mode, while one or more of the adsorbent beds are being regenerated. If two or more beds of adsorbent are operating simultaneously in either the drying mode or the regeneration mode, they may be arranged in a series flow arrangement or in a parallel flow arrangement, as required.

Regeneration of the adsorbent is effected by the action of the interstage compressed gas being caused to flow through the adsorbent bed. The interstage compressed gas is preferably employed directly from the outlet of the compression stage from which it exits without undergoing any cooling. This principle of adsorbent regeneration is sometimes referred to as "heat of compression" regeneration. As noted above, the action of the interstage compressed gas on the adsorbent is to desorb and remove moisture from the adsorbent, collected during the operation of the adsorbent bed in the drying mode. It will thus be appreciated that the interstage compressed gas leaving the adsorbent bed during the regeneration mode has a high moisture content, compared to the gas entering the adsorbent bed. Accordingly, it is preferable to reduce the moisture content before the next stage of compression can be effected. Typically, a multistage compressor arrangement comprises interstage coolers to cool the interstage compressed gas prior to further compression. Moisture present in the interstage compressed gas leaving the adsorbent bed during the regeneration is in the form of vapor. Cooling the interstage compressed gas results in moisture in the gas condensing. A separator may be employed to remove the condensate from the interstage compressed gas prior to it being fed to the inlet of the next compression stage. The separator may be integral with or separate from the interstage cooler.

It is preferred that the final stage compressed gas is passed through a cooler in order to be cooled prior to being fed to the dryer and passed through the adsorbent bed operating in the drying mode. Again, the effect of cooling the final stage compressed gas is to condense moisture present in the gas leaving the final compression stage. The condensate is removed by means of a separator, which may be separate from or integral with the cooler.

In a preferred embodiment, the coolers and separators used to cool the interstage compressed gas are integral with the compressor.

Cooling of compressed gas may be carried out by heat exchange with a suitable heat exchange medium, conveniently water, in heat exchangers, such as shell and tube or plate heat exchangers, well known in the art. Other forms of cooling the various compressed gas streams in the process, for example refrigeration, may also be employed. Such methods of cooling are well known in the art. Cooling of the compressed gas and separation of the condensate may be carried out in a single or multiple stages. As noted above, in one preferred embodiment, the coolers comprise integral drains, allowing condensate to be collected and removed from the compressed gas stream as it is being cooled.

It has been found that the regeneration of the adsorbent is dependent upon the temperature of the interstage gas being used as the regeneration medium. Preferably, the interstage gas enters the adsorbent bed at a temperature of at least about 240° F., more preferably at least about 260° F. At temperatures below these preferred temperatures, a less than optimum regeneration of the adsorbent may result.

The length of time that the bed of adsorbent can operate in the drying mode will depend upon the nature of the adsorbent, the moisture content of the final stage compressed gas and the space velocity of the compressed gas through the bed. Similarly, the length of time to effect regeneration of the bed will depend upon the nature of the adsorbent, the moisture content and temperature of the interstage compressed gas being used as the regeneration medium and the space velocity of the compressed gas. Cycle times for the adsorbent bed between the drying mode and the regeneration mode may range from several minutes to several hours, depending upon the aforementioned parameters. Typical cycle times are of the order of from 1 to 2 hours.

Switching of the operation of the adsorbent bed from the regeneration mode to the drying mode may be carried out directly. Moisture laden gas remaining in the adsorbent bed at the end of the operation in the regeneration mode may give rise to a temporary rise in the dew point of the final compressed gas product. In such cases, it may be preferred to purge the adsorbent bed once operation in the regeneration mode has been completed by venting the gas in the adsorbent bed to the atmosphere or a suitable let down vessel. In this way, the moisture laden gas remaining in the adsorbent bed at the end of the regeneration cycle is not passed through to the product of the system and the dew point of the final compressed gas product remains constant. The aforementioned purging and venting may be dispensed with when the final compressed gas is being used for applications which are not sensitive to a temporary minor rise in the dew point of the compressed gas.

Suitable adsorbents for use in the process of the present invention are well known in the art and are commercially available. Examples of suitable adsorbents include calcium aluminosilicate clays, amorphous silicates, and silica and alumina gels.

The method and apparatus of the present invention may be used to compress and dry any suitable gas. The method and apparatus is particularly suitable for the compression and drying of air, especially oil-free air.

BRIEF DESCRIPTION OF THE DRAWINGS

The present invention will be understood more fully from the detailed description given herein below and from the accompanying drawings of preferred embodiments of the invention. The description and drawings should not be taken to limit the invention to the specific embodiments, but are for explanation and understanding purposes only.

In the drawings.

DESCRIPTION OF THE PREFERRED
EMBODIMENTS OF THE INVENTION

Figure 1:
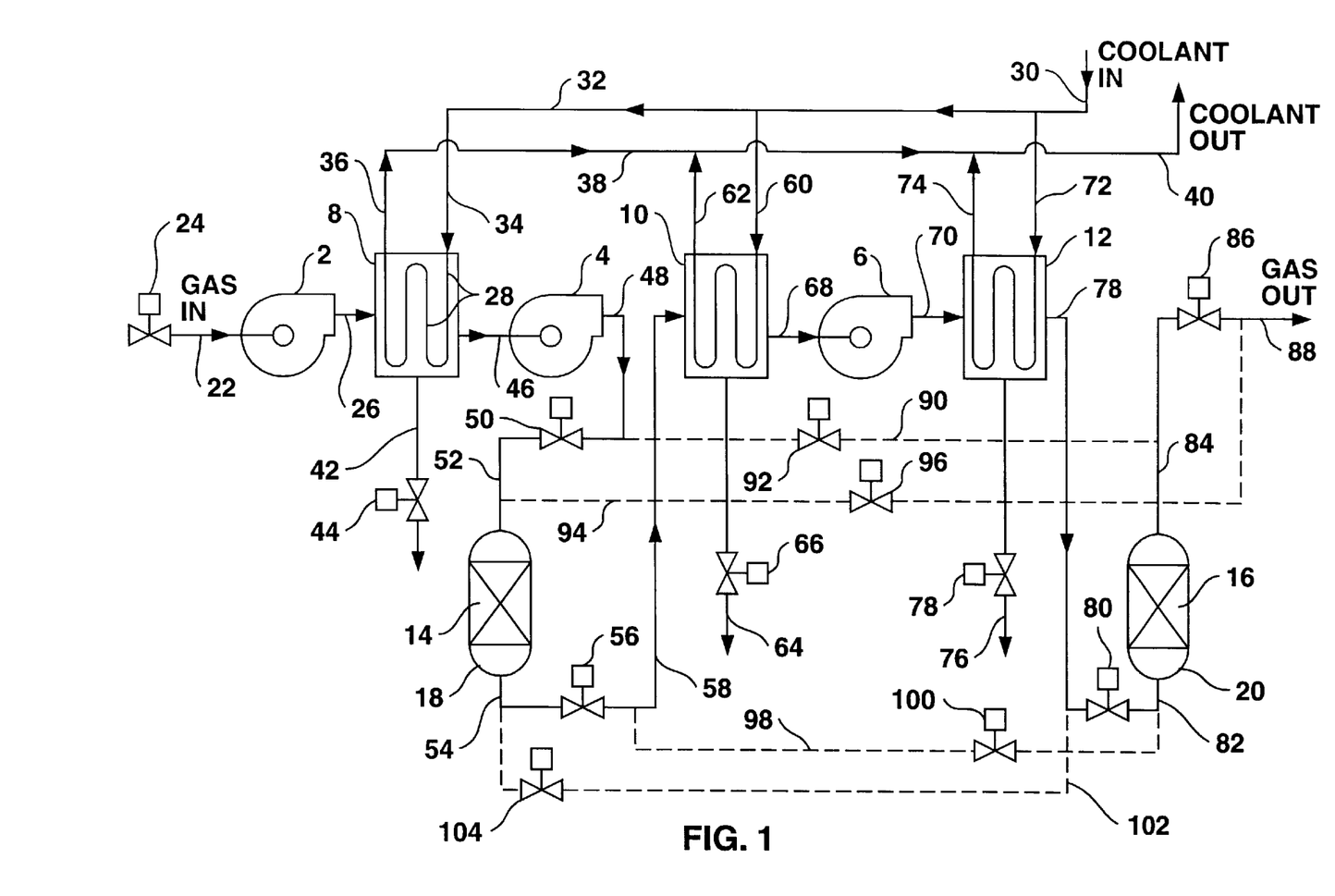
FIG. 1 is a schematic representation of one embodiment of the present invention in a first mode of operation.

Referring to FIG. 1, there is shown a schematic representation of process apparatus according to the present invention. The general arrangement of the apparatus of the embodiment shown in FIG. 1 comprises a multistage compressor having three compression stages, each provided by a single stage compressor unit 2, 4 and 6. Compressed gas coolers 8, 10 and 12 are provided to cool the gas leaving the compressors 2, 4 and 6 respectively. A dryer comprises first and second beds of regenerative adsorbent or desiccant 14 and 16, each retained within respective first and second dryer vessels 18 and 20.

The apparatus represented in FIG. 1 is shown operating in a first mode of operation, that is with the adsorbent bed 14 operating in the regeneration mode and the adsorbent bed 16 operating in the drying mode. The process lines in use during this mode of operation are shown in FIG. 1 in solid lines. The apparatus of FIG. 1 may also be operated in a second mode, that is with the adsorbent bed 14 operating in the drying mode and the adsorbent bed 16 operating in the regeneration mode. For ease of comparison, the process lines required to operate the apparatus of FIG. 1 in the second mode are shown in broken lines. The operation of the apparatus in the second mode is described hereinafter and shown in FIG. 2. The process configuration of FIG. 1 and its operation will now be described in detail.

The compressor 2 is a centrifugal compressor and is the first stage compressor in the process. Gas to be compressed is fed to the first stage compressor 2 by means of a line 22. The flowrate of the gas may be controlled using a valve 24 located in the line 22. The valve 24 may also be used to isolate the entire apparatus from the gas feed during periods of shutdown or inactivity. The gas to be compressed is most suitably air, although other gases may be processed using the apparatus of FIG. 1.

Interstage compressed gas leaves the first stage compressor 2 and is fed through a line 26 to the first stage intercooler 8. The first stage intercooler 8 is a shell and tube heat exchanger, having a plurality of cooling tubes 28 arranged inside the shell of the intercooler. The interstage compressed gas entering the first stage intercooler 8 from the line 26 is caused to flow inside the shell of the heat exchanger around the tubes 28. A coolant, most preferably water, is produced in a coolant plant (not shown). The coolant is fed through a line 30 to a coolant feed header 32. Coolant is withdrawn from the feed header 32 along a line 34 to the tube-side inlet of the first stage intercooler 8. Coolant leaving the first stage intercooler 8 passes along a line 36 to a coolant return header 38, from where it passes along a return line 40 to the coolant plant (not shown).

The first stage intercooler 8 serves to cool the interstage compressed gas to a temperature suitable for it to be passed to the second compression stage. Cooling of the compressed gas causes moisture in the gas to condense. The first stage intercooler is fitted with a drain 42, which may be opened periodically using a drain valve 44 located in the drain 42, in order to remove condensate from the intercooler 8. The drain valve 44 may be opened and closed by a timer (not shown). Alternatively, the drain valve 44 may be operated in response to a condensate level indicator (not shown) situated to monitor the condensate level in the intercooler 8.

Cooled interstage gas leaves the first stage intercooler 8 and is fed through a line 46 to the inlet of the second stage compressor 4. The second stage compressor 4 is a centrifugal compressor. Interstage compressed gas leaving the second stage compressor 4 is passed via a line 48 through a valve 50 and into a line 52 connecting with an opening in the top of the first dryer vessel 18. The valve 50 remains open while the apparatus is in the first mode of operation, in order to feed interstage compressed gas to the first adsorbent bed 14. The interstage compressed gas in the line 52 is hot, the heat of compression having remained in the gas after the second compression stage. Hot interstage compressed gas enters the first dryer vessel 18 from the line 52 and flows through the bed of adsorbent 14. FIG. 1 shows the direction of flow of the interstage compressed gas to be downwards through the bed 14.

The bed of adsorbent 14 comprises particles of adsorbent or desiccant and is retained in the first dryer vessel 18 in a fixed bed arrangement. Techniques for retaining the particles of adsorbent within the vessel 18 are standard and well known in the art. The action of the hot interstage compressed gas passing through the first adsorbent bed 14 is to desorb moisture from the adsorbent particles, which is vaporized and leaves the first dryer vessel 18 in the compressed gas. The interstage compressed gas/vapor mixture leaves the first dryer vessel 18 through an opening in the bottom of the vessel connecting with a line 54. The gas/vapor mixture passes through a valve 56, from where it is fed via a line 58 to the second stage intercooler 10. The valve 56 remains open while the process is operating in the first mode of operation.

The second stage intercooler 10 is similar in arrangement to the first stage intercooler 8, described hereinbefore. Thus, the gas/vapor mixture enters the shell of the intercooler 10. Coolant is withdrawn from the coolant feed header 32 through a line 60, from where it flows through the tubes of the intercooler 10, before being passed along a line 62 to the coolant return header 38. A drain 64 is located in the bottom of the intercooler 10, having a drain valve 66 operating as described above in connection with the first stage intercooler 8. Condensate is periodically removed from the second stage intercooler 10 by means of the drain 64.

The cooled interstage compressed gas leaves the second stage intercooler and is fed through a line 68 to the third stage compressor 6. The third stage compressor 6 is a centrifugal compressor and compresses the interstage compressed gas to the final desired pressure. The gas leaving the third stage compressor 6 is the final stage compressed gas requiring drying. The final stage compressed gas is fed from the third stage compressor 6 to the final stage cooler 12 by a line 70. The final stage cooler 12 is similar in design to the intercoolers 8 and 10 described hereinbefore. Coolant is fed to and from the tubes of the cooler 12 by lines 72 and 74, which connect with the coolant feed header 32 and the coolant return header 38 respectively. A drain 76, together with a drain valve 78, is provided to periodically remove condensate from the bottom of cooler 12 in the manner as described above.

Cooled final stage compressed gas is fed from the final stage intercooler 12 via a line 78 through a valve 80 to an opening in the bottom of the second dryer vessel 20 via a line 82. The valve 80 remains open while the process is in the first operating mode. The second dryer vessel 20 holds a fixed bed 16 of adsorbent particles in an arrangement identical to that of the first dryer vessel 18 discussed hereinbefore. The final stage compressed gas passes through the bed of adsorbent 16. Moisture is removed from the compressed gas by adsorption into the particles in the fixed bed 16, thus drying the gas. The direction of flow of the final stage compressed gas is shown in FIG. 1 as being upwards through the adsorbent bed 16.

The thus dried final stage compressed gas leaves the second dryer vessel 20 through an opening in the top of the vessel connecting with a line 84, passes through a valve 86 and into a compressed gas product line 88, from where it is passed to the various end users of the gas. The valve 86 remains open while the process operates in the first mode of operation.

Figure 2:
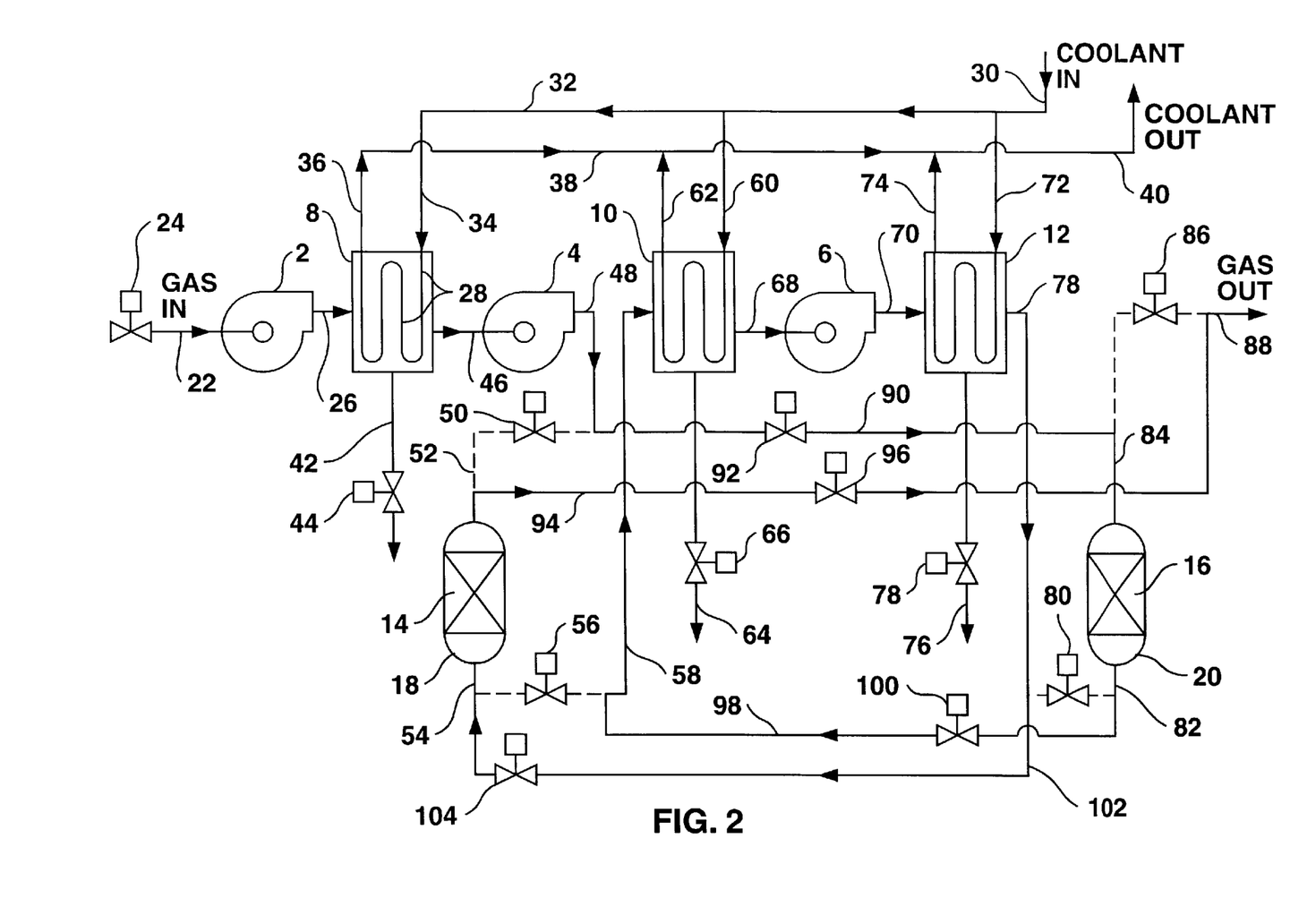
FIG. 2 is a schematic representation of the embodiment of FIG. 1 in a second mode of operation.

As mentioned above, in addition to the equipment needed to operate the process in the first operating mode, FIG. 1 shows, in broken lines, those lines and valves required in order to operate the process in the second operating mode. FIG. 2 shows the identical equipment to FIG. 1, but with the lines and valves required for operation in the second mode shown in full and the lines and valves rendered redundant by the second mode shown in broken lines.

In addition to the equipment shown in FIG. 1 and described hereinbefore, a line 90 is provided between the line 48 leaving the second stage compressor 4 and the line 84 connecting with the opening in the top of the second dryer vessel 20. A valve 92 is situated in the line 90 and is closed in the first operating mode of the process. A line 94 extends from the line 52 connecting with the top opening in the first dryer vessel 18 to the gas product line 88. A valve 96 is located in the line 94 and is closed during operation in the first operating mode. A line 98 connects the line 58, supplying gas to the inlet of the second stage intercooler 10, with the line 82, connecting with the opening in the bottom of the second dryer vessel 20. A valve 100 is located in the line 98 and is closed during operation of the process in the first operating mode. Finally, a line 102 extends from the line 54, connecting with the opening in the bottom of the first dryer vessel 18, to the line 78, connected with the outlet of the final stage cooler 12. A valve 104 in the line 102 remains closed during operation in the first operating mode.

Referring to FIG. 2, apparatus according to the present invention is shown arranged for operation in the second operating mode. As already noted, in this mode of operation, the first adsorbent bed 14 is in the drying mode and dries final stage compressed gas, while the second adsorbent bed 16 is in the regeneration mode and is undergoing regeneration by the action of the interstage compressed gas leaving the second stage compressor 4. To switch from the first operating mode to the second operating mode, the valves 50, 56, 80 and 86 are closed, and the valves 92, 96, 100 and 104 are opened.

In the second operating mode, the process operates as described hereinbefore with reference to FIG. 1 up to the compression of the gas in the second stage compressor 4. Interstage compressed gas leaving the second stage compressor 4 is fed via line 48 to line 90, thereafter to line 84 and into the second dryer vessel 16 through the opening in its top. The interstage compressed gas passes down through the bed of adsorbent 16. Heat in the gas desorbs and vaporizes moisture retained in the pores of the adsorbent during the previous operation of the process in the first operating mode, in which the second adsorbent bed was active in drying the final stage compressed gas. The interstage compressed gas leaves the second dryer vessel 20 through the opening in its bottom, passes into the line 82 and into the line 98, from where it is fed to the inlet of the second stage intercooler 10 by the line 58.

The cooling of the interstage compressed gas by the second stage intercooler 10, the subsequent compression of the gas by the third stage compressor 6, and the cooling of the final stage compressed gas by the final stage cooler 12 proceed as described above with reference to FIG. 1.

The cooled final stage compressed gas leaves the final stage cooler 12 and passes through the line 78 to the line 102, from which it passes through the line 54 and into the first dryer vessel 18 through the opening in its bottom. The gas passes upwards through the bed of adsorbent 14 in the vessel 18. As it does so, moisture in the gas is removed by adsorption into the adsorbent particles. The gas leaves the first dryer vessel 18 through the opening in its top and passes via the line 52 into the line 94, from where it is fed into the gas product line 88 and on to the end user.

Switching from the first to the second mode of operation occurs when the adsorbent bed operating in the drying mode becomes saturated with moisture and ceases to dry the final stage compressed gas to the required degree. This may be determined by monitoring the moisture content of the gas leaving the adsorbent bed in question. Similarly, the completion of the regeneration the adsorbent bed being regenerated may be determined by monitoring the moisture content of the gas leaving the bed in question. Completion of the regeneration will be indicated by a low moisture content in the gas, indicating that moisture has been removed from the adsorbent to the desired level. In the preferred embodiment, in which there are two or more beds of adsorbent, it is preferred that the apparatus and process operating conditions are selected such that, under normal operating conditions, the time taken to regenerate an adsorbent bed in the regeneration mode is about the same as the time taken for the bed to become saturated during operation in the drying mode.

Switching from the second operating mode back to the first operating mode, that is to reverse the operating modes of the two dryer vessels 18 and 20, is achieved using the valves 50, 56, 82, 86, 92, 96, 100 and 104, in the reverse manner to that described above. The operation of the valves to switch from one operating mode to the other may be effected by hand. Preferably, the opening and closing of the valves is carried out automatically. Accordingly, the valves 50, 56, 82, 86, 92, 96, 100 and 104 are indicated in FIGS. 1 and 2 as being control valves. Suitable instrumentation, controllers and control lines are provided in order to operate the valves. The operation may be coordinated using the moisture detection systems described above. The control system has been omitted from FIGS. 1 and 2 for the purposes of clarity.

At the start of the switching between operating modes, hot moisture-containing gas is present in the dryer vessel 18 or 20 operating in the regeneration mode which is to be operated in the drying mode. As a result of the switching between operating modes, a temporary rise in the dew point of the final compressed gas product may occur. Accordingly, each dryer vessel 18 and 20 may be provided with lines and valves (not shown) to allow the gas within the vessel to be purged by being vented to the atmosphere or a suitable let down vessel. Once the purging of the vessel 18 or 20 is complete, the switching of operating modes may be completed and the newly regenerated adsorbent used to dry the final compressed gas.

Figure 3:
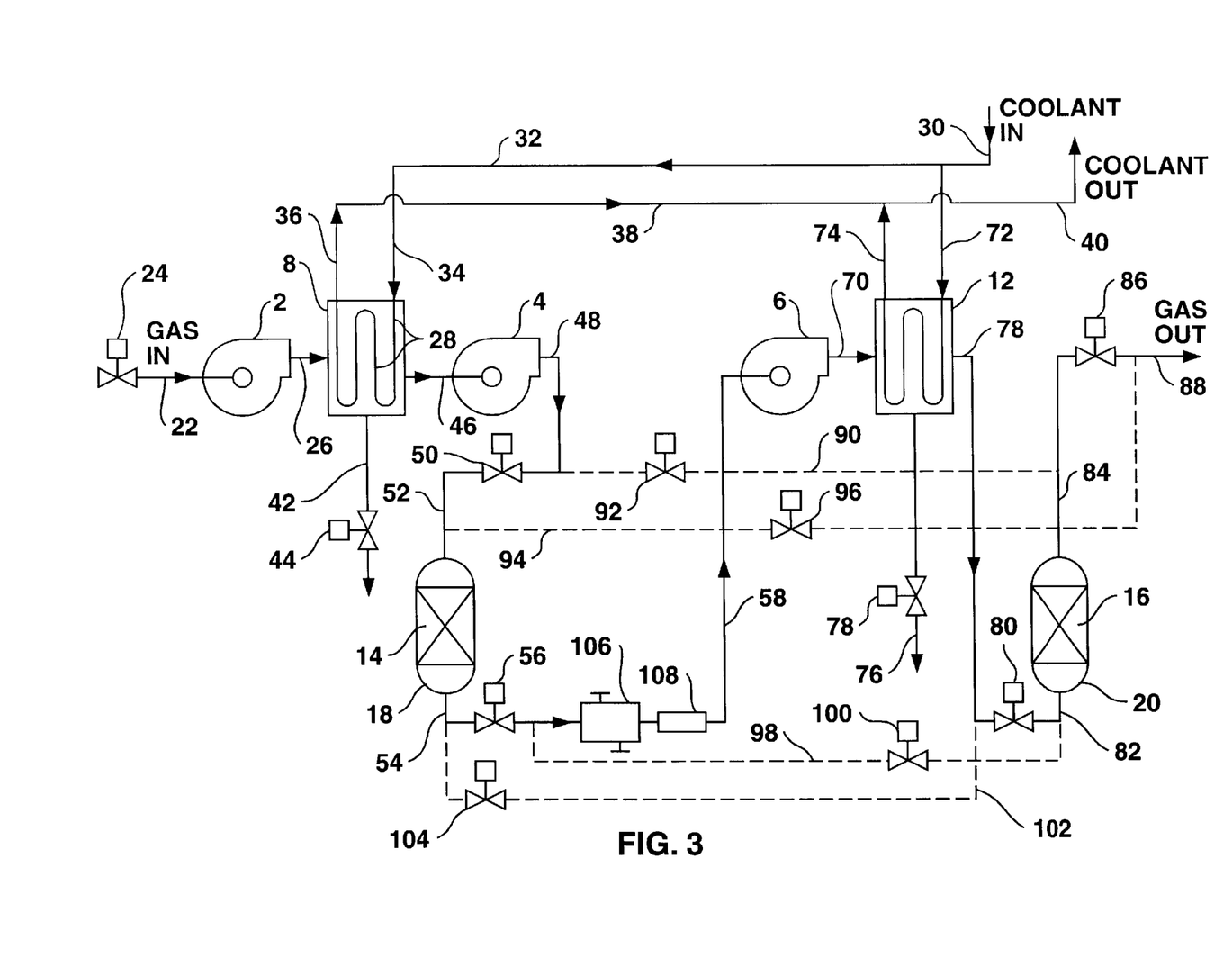
FIG. 3 is a schematic representation of a second embodiment of the present invention in a first mode of operation.

Referring to FIG. 3, an alternative embodiment of the present invention is shown. The process scheme shown in FIG. 3 is similar to that of the embodiment of FIGS. 1 and 2, in that a three stage compression system is employed, in combination with a dryer comprising two dryer vessels, each with a packed bed of adsorbent. Process equipment in the embodiment of FIG. 3 that is common with the embodiment of FIGS. 1 and 2 has been indicated using the same reference numerals. Thus, the process scheme of FIG. 3 comprises a first stage compressor 2 and a first intercooler 8 for cooling the interstage compressed gas leaving the first stage compressor 2. The cooled interstage compressed gas is further compressed in a second stage compressor 4. Interstage compressed gas leaving the second stage compressor 4 is passed to a first dryer vessel 18 containing a fixed bed 14 of a regenerable adsorbent. The interstage compressed gas passes downwards through the bed of adsorbent 14 and regenerates it, in the manner described above in connection with the embodiment of FIG. 1. After being used in the regeneration of the adsorbent, the interstage compressed gas is further compressed in a third stage compressor 6.

The embodiment of FIG. 3 differs in that the interstage compressed gas leaving the first dryer vessel 18 passes to a cooler 106. The cooler 106 is a shell and tube cooler of conventional design. However, the cooler 106 is piped directly together with the third stage compressor 6 (although shown separately in FIG. 3, for clarity). As described above, the effect of cooling the compressed gas is to condense vapor present in the gas. Once the gas has been cooled, it is passed to a separator 108, in which the condensate is separated from the gas. Again, the separator 108 is integral with the third stage compressor 6. After leaving the separator 108, the interstage gas is passed to the third stage compressor 6, for final compression.

The remainder of the equipment and processing in the embodiment of FIG. 3 are as described hereinbefore with reference to FIG. 1.

Figure 4:
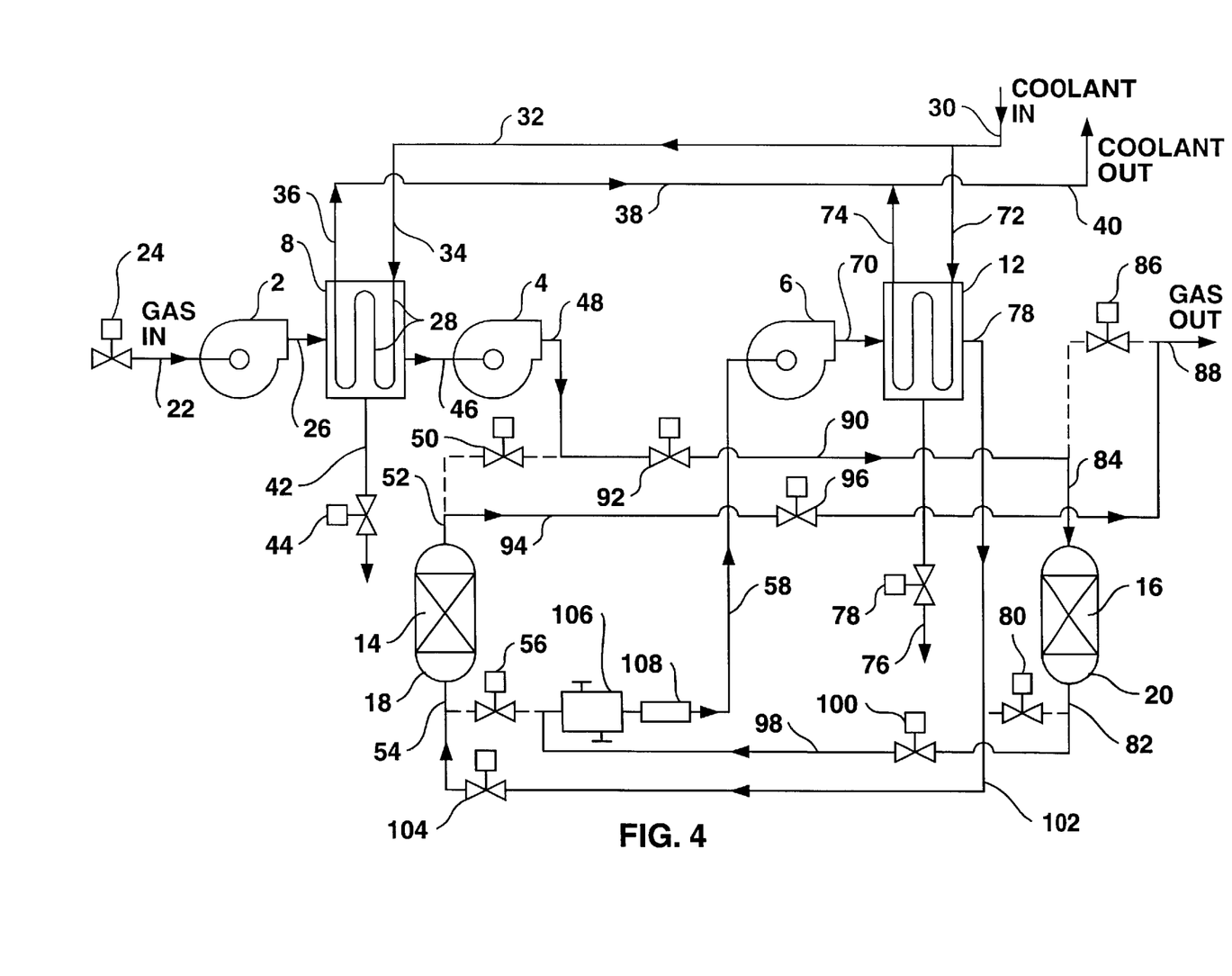
FIG. 4 is a schematic representation of the embodiment of FIG. 3 in a second mode of operation.

FIG. 3 shows the process equipment and flow scheme of the process in the first operating mode, that is with the first dryer vessel 18 being in the regeneration mode, and the second dryer vessel 20 being in the drying mode. Equipment present but not employed in this operating mode is shown in FIG. 3 by a broken line. FIG. 4 illustrates the embodiment of FIG. 3 in the second operating mode, that is with the first dryer vessel 18 being in the drying mode and the second dryer vessel 20 operating in the regeneration mode. Again, FIG. 4 shows process equipment redundant while operating in the second operating mode by broken lines. Switching from one operating mode to the other is achieved in the manner described above with respect to FIGS. 1 and 2. Again, this operation may be automated, as described above.

It will be appreciated that variations to the embodiments shown in FIGS. 1 to 4 may be employed. Thus, interstage compressed gas may be drawn from the outlet of the first stage compressor 2 and used in the regeneration of the adsorbent beds, provided that the temperature of this gas is suitable for optimum regeneration. Thus, referring to FIG. 5, an embodiment of the present invention is illustrated in which three compression stages are employed, with compressed gas leaving the first compression stage being used to regenerate the beds of adsorbent.

Figure 5:
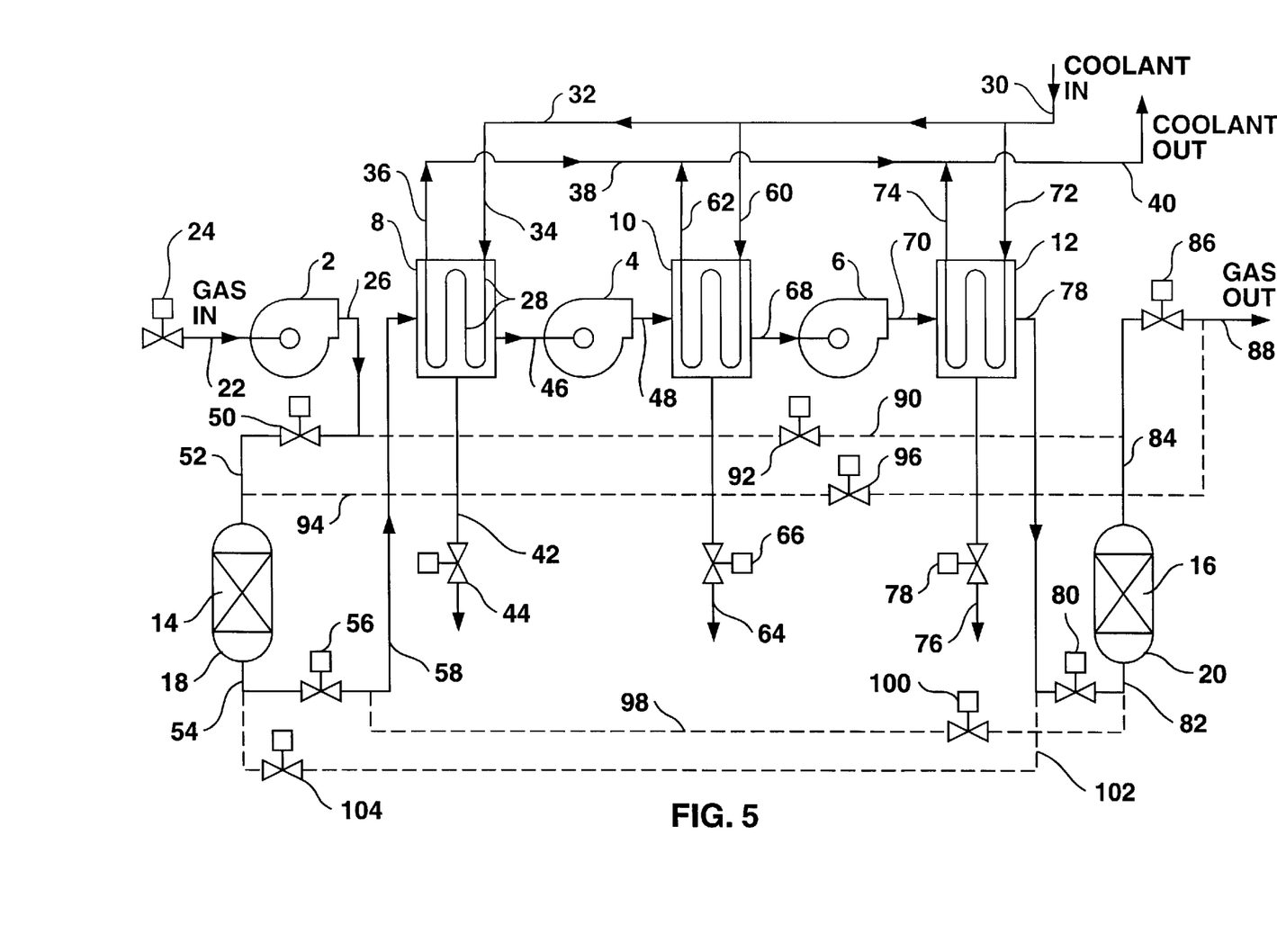
FIG. 5 is a schematic representation of a third embodiment of the present invention in a first mode of operation.

The process scheme shown in FIG. 5 is similar to that of the embodiment of FIGS. 1 and 2, in that a three stage compression system is employed, in combination with a dryer comprising two dryer vessels, each with a packed bed of adsorbent. Process equipment in the embodiment of FIG. 5 that is common with the embodiment of FIGS. 1 and 2 has been indicated using the same reference numerals. Thus, the process scheme of FIG. 5 comprises a first stage compressor 2 and a first intercooler 8 for cooling the interstage compressed gas leaving the first stage compressor 2. The cooled interstage compressed gas is further compressed in a second stage compressor 4. However, before undergoing cooling and further compression, interstage compressed gas leaving the first stage compressor 2 is passed via a line 26 to a first dryer vessel 18 containing a fixed bed 14 of a regenerable adsorbent. The interstage compressed gas passes downwards through the bed of adsorbent 14 and regenerates it, in the manner described above in connection with the embodiment of FIG. 1. The compressed gas leaving the first dryer vessel 18 is passed through a line 58 to the intercooler 8, where it is cooled and condensate removed. Further compression of the gas is carried out in the second stage compressor 4.

The embodiment of FIG. 5 differs in that the interstage compressed gas leaving the first stage compressor 2 is used to regenerate the adsorbent in the bed 14. As noted above, the temperature of the compressed gas leaving the first and second compression stages is different. Accordingly, it is possible to select the most appropriate compressed gas stream for regenerating the adsorbent. In the embodiment of FIG. 5, the first interstage compressed gas leaving the first stage compressor 2, being hotter than the second interstage compressed gas, is most suitable.

The remainder of the equipment and processing in the embodiment of FIG. 5 are as described hereinbefore with reference to FIG. 1.

Figure 6:
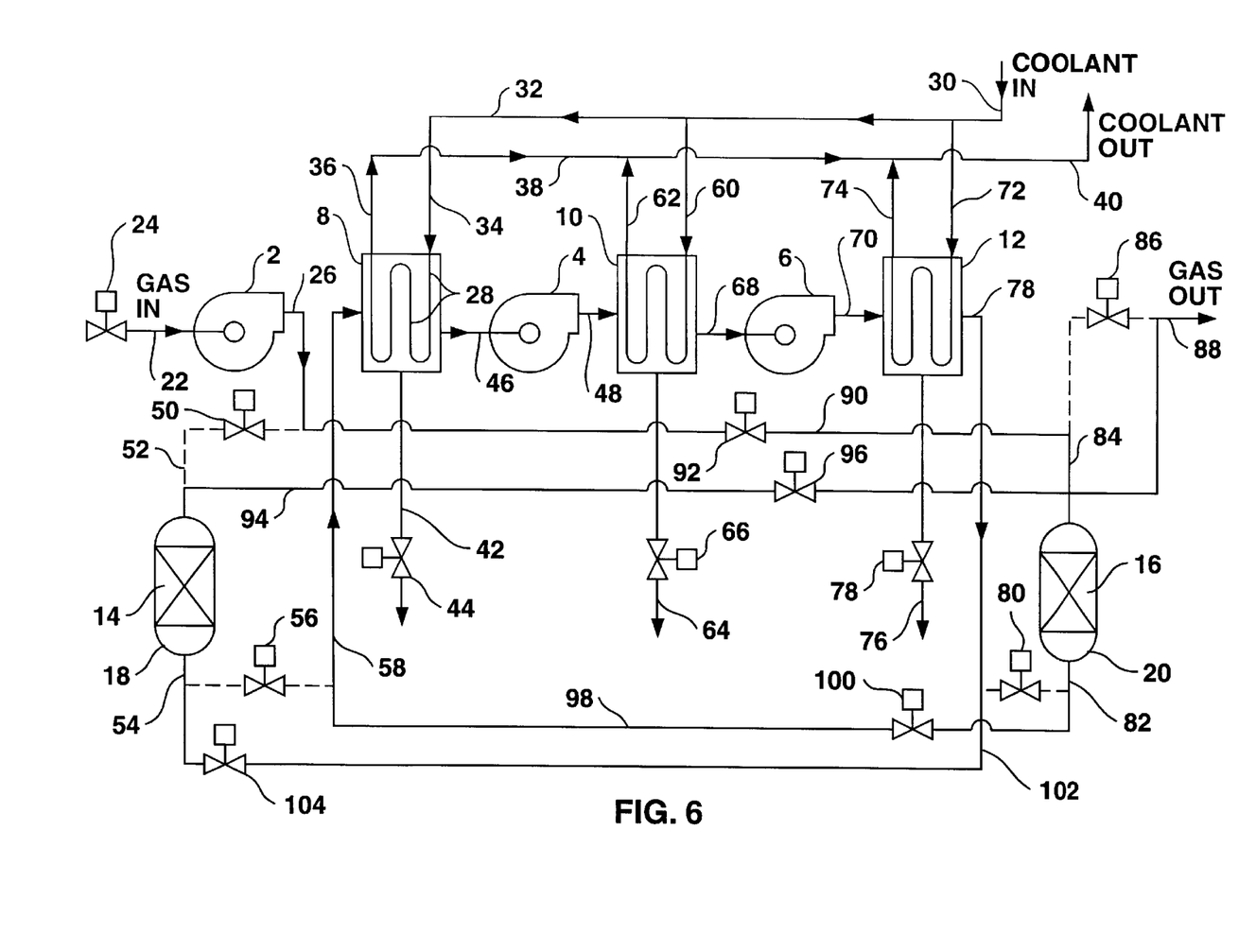
FIG. 6 is a schematic representation of the embodiment of FIG. 5 in a second mode of operation.

FIG. 5 shows the process equipment and flow scheme of the process in the first operating mode, that is with the first dryer vessel 18 being in the regeneration mode, and the second dryer vessel 20 being in the drying mode. As before, equipment present but not employed in this operating mode is shown in FIG. 5 by a broken line. FIG. 6 illustrates the embodiment of FIG. 5 in the second operating mode, that is with the first dryer vessel 18 being in the drying mode and the second dryer vessel 20 operating in the regeneration mode. Again, FIG. 6 shows process equipment redundant while operating in the second operating mode by broken lines. Switching from one operating mode to the other is achieved in the manner described above with respect to FIGS. 1 and 2. Again, this operation may be automated, as described above.

Additional compression stages may also be employed, depending upon the needs of the end user of the compressed gas. Further, three or more beds of adsorbent may be used, operating in series or parallel, in order to achieve the required drying duty.

While the method and apparatus of the present invention have been described in connection with the preferred embodiments, it is not intended to limit the invention to the particular form set forth, but on the contrary, it is intended to cover such alternatives, modifications, and equivalents as may be included within the spirit and scope of the invention as defined by the appended claims.

What is claimed is:

1. A method for compressing and drying a gas, comprising compressing the gas in a multistage compressor, which compressor produces both an interstage compressed gas and a final stage compressed gas, and drying the final stage compressed gas by contacting the final stage compressed gas with a regenerable adsorbent, in which method said interstage compressed gas is used to regenerate the adsorbent.

2. A method as claimed in claim 1, wherein the multistage compressor comprises three compression stages.

3. A method as claimed in claim 2, wherein said interstage gas is produced by the first compression stage and is used to regenerate the regenerable adsorbent.

4. A method as claimed in claim 2, wherein said interstage gas is produced by the second compression stage and is used to regenerate the regenerable adsorbent.

5. A method as claimed in claim 1, wherein all the interstage compressed gas produced by a stage is used to regenerate the adsorbent.

6. A method as claimed in claim 1, wherein first and second beds of said regenerable adsorbent are provided, each capable of operating in a drying mode to effect said drying, in which said final stage compressed gas is passed through the bed, and a regenerating mode to regenerate said adsorbent, in which said interstage compressed gas is passed through the bed, each bed switching from the drying mode to the regeneration mode.

7. A method as claimed in claim 6, wherein one of the first and second beds of regenerable adsorbents is in the drying mode, while the other of the first and second beds of regenerable adsorbent is in the regeneration mode.

8. A method as claimed in claim 1, wherein the adsorbent is retained in a fixed bed, the final stage compressed gas and interstage compressed gas being caused to flow through the bed when the adsorbent is respectively being used to dry and is being regenerated.

9. A method as claimed in claim 8, wherein the direction of flow of said final stage compressed gas through the fixed bed is opposite to the direction of flow of said interstage compressed gas through the bed.

10. A method as claimed in claim 1, wherein the interstage compressed gas is used to regenerate the adsorbent at a temperature of at least 240° F.

11. A method as claimed in claim 10, wherein the interstage compressed gas is used to regenerate the adsorbent at a temperature of at least 260° F.

12. A method as claimed in claim 1, wherein the interstage gas used to regenerate the adsorbent is cooled before undergoing further compression.

13. A method as claimed in claim 12, wherein condensate is removed from the cooled interstage gas before the gas undergoes further compression.

14. A method for compressing and drying a gas, comprising the steps of:
    compressing the gas in a first stage to produce a first interstage compressed gas;
    passing the first interstage compressed gas through a first bed of regenerable adsorbent to remove moisture from and regenerate the adsorbent;
    cooling the first interstage compressed gas and removing condensate from the gas;
    compressing the cooled first interstage compressed gas in a second stage to produce a second interstage compressed gas;
    cooling the second interstage compressed gas;
    compressing the second interstage compressed gas to produce a final stage compressed gas;
    cooling the final stage compressed gas;
    passing the final stage compressed gas through a second bed of regenerable adsorbent to dry the gas; and
    switching the flow of the second interstage compressed gas to the second bed of regenerable adsorbent and the flow of the final stage compressed gas to the first bed of regenerable adsorbent when the second bed of regenerable adsorbent becomes saturated with moisture from the final stage compressed gas.

15. Apparatus for compressing and drying a gas, comprising a compressor having a plurality of compression stages and capable of producing interstage compressed gas and final stage compressed gas, a dryer comprising a bed of regenerable adsorbent, in which the final stage compressed gas may be contacted with the adsorbent in order to dry the gas, and in which said interstage gas may be contacted with the adsorbent in order to regenerate the adsorbent.

16. Apparatus as claimed in claim 15, wherein the compressor comprises three compression stages, said interstage gas leaving the second compression stage being usable to regenerate the adsorbent.

17. Apparatus as claimed in claim 15, wherein said bed of regenerable adsorbent comprises two beds of regenerable adsorbent.

18. Apparatus as claimed in claim 17, wherein the two beds of regenerable adsorbent are each operable in a drying mode to dry the gas, in which said final stage compressed gas flows through the bed, and a regeneration mode to regenerate the adsorbent, in which said interstage compressed gas flows through the bed, each bed being switchable between the drying mode and the regeneration mode.

19. Apparatus as claimed in claim 17, wherein one of the two beds of regenerable adsorbent is operable in the drying mode, while the other of the two beds of regenerable adsorbent is simultaneously operable in the regeneration mode.

20. Apparatus as claimed in claim 15, wherein a cooler is provided to cool the interstage compressed gas that has contacted the adsorbent, before the gas is further compressed.

21. Apparatus as claimed in claim 20, wherein a condensate separator is provided to remove condensate from the cooled interstage compressed gas.

22. Apparatus as claimed in claim 21, wherein the cooler and the condensate separator are integral with the compressor.

23. Apparatus for compressing and drying a gas, comprising:
    a first stage compressor capable of producing first interstage compressed gas;
    a cooler for the first interstage compressed gas;
    a separator for removing condensate from the cooled first interstage compressed gas;
    a second stage compressor capable of compressing the first interstage compressed gas to produce a second stage compressed gas;
    a cooler for the second interstage compressed gas;
    a third stage compressor capable of compressing the second interstage compressed gas to produce a final stage compressed gas;
    a cooler for cooling the final stage compressed gas; and
    first and second beds of regenerable adsorbent, each operable in a drying mode and a regeneration mode;
    the arrangement being such that the first interstage compressed gas, prior to being cooled, is supplied to one of the first or second beds of regenerable adsorbent operating in the regeneration mode and the final stage compressed gas is supplied to the other of the first of second beds of regenerable adsorbent operating in the drying mode.

* * * * *